United States Patent [19]
Albert et al.

[11] Patent Number: 5,991,410
[45] Date of Patent: *Nov. 23, 1999

[54] WIRELESS ADAPTOR AND WIRELESS FINANCIAL TRANSACTION SYSTEM

[75] Inventors: Herb Albert, Bellevue; Paul Renton, Seattle; Lorin Rowe, Bellevue; Stephen R. Schramke, Seattle; Glen Zorn, Kirkland, all of Wash.

[73] Assignee: AT&T Wireless Services, Inc., Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/647,299

[22] Filed: May 9, 1996

Related U.S. Application Data

[62] Division of application No. 08/388,729, Feb. 15, 1995.

[51] Int. Cl.⁶ .............................. H04K 1/00; H04L 9/00; G06F 17/60
[52] U.S. Cl. .................................. 380/24; 380/49; 705/44
[58] Field of Search .......................... 380/24, 49; 705/39, 705/42, 43, 44

[56] References Cited

U.S. PATENT DOCUMENTS

| | | |
|---|---|---|
| 3,892,948 | 7/1975 | Constable ............................ 340/825.33 |
| 4,578,530 | 3/1986 | Zeidler ....................................... 380/24 |
| 4,665,396 | 5/1987 | Dieleman ............................ 340/825.34 |
| 4,747,050 | 5/1988 | Brachtl et al. ............................. 380/24 |
| 4,845,740 | 7/1989 | Tokuyama et al. ........................ 379/91 |
| 4,926,325 | 5/1990 | Benton ................................ 340/825.33 |
| 5,208,446 | 5/1993 | Martinez .................................. 235/380 |
| 5,231,570 | 7/1993 | Lee ....................................... 340/825.33 |
| 5,276,444 | 1/1994 | McNair ............................... 340/825.33 |
| 5,294,782 | 3/1994 | Kumar ...................................... 235/462 |
| 5,367,452 | 11/1994 | Gallery et al. ........................... 364/401 |
| 5,371,797 | 12/1994 | Bocinsky, Jr. ............................ 380/24 |
| 5,408,513 | 4/1995 | Busch, Jr. et al. ........................ 379/59 |
| 5,485,510 | 1/1996 | Colbert ............................... 340/825.33 |
| 5,500,890 | 3/1996 | Rogge ................................ 340/825.33 |
| 5,511,122 | 4/1996 | Atkinson .................................. 380/25 |
| 5,524,072 | 6/1996 | Labaton et al. ........................... 380/24 |
| 5,706,330 | 1/1998 | Bufferd et al. ............................ 379/58 |
| 5,722,066 | 2/1998 | Hu ........................................... 455/403 |

*Primary Examiner*—Gail O. Hayes
*Assistant Examiner*—Hrayr A. Sayadian

[57] ABSTRACT

The present invention is a method of a wireless adaptor receiving financial information, indicative of financial transactions, in PSTN compatible format, encrypting and converting the information into PSTN non-compatible format, transmitting the encrypted and converted information to a host computer, decrypting the information by the host computer, transmitting the decrypted information to an authorization processor, which transmits back to the host computer signals indicating authorization or denial of the transaction, the host computer transforming the signal received from the authorization processor to PSTN non-compatible format, and transmitting to the to the financial device the authorization or denial signal.

12 Claims, 13 Drawing Sheets

WIRELESS ADAPTOR AND WIRELESS FINANCIAL TRANSACTION SYSTEM

CROSS-REFERENCE TO RELATED APPLICATION

This application is a division of U.S. patent application Ser. No. 08/388,729, filed Feb. 15, 1995.

TECHNICAL FIELD

The invention relates generally to the field of financial transaction processing and authorization and more specifically to wireless data communications and data security for financial transaction processing.

BACKGROUND OF THE INVENTION

A business or merchant may want to accept credit cards or debit cards as payment for goods and services in addition to accepting cash payments. However, acceptance of a credit or debit card as payment requires that the merchant verify that the credit or debit card is valid and that a charge submitted by the merchant to the issuer of the credit or debit card will be accepted by the issuing organization.

The validity of a cash payment is easily verified by the merchant's visual examination of the cash which is offered for payment. Counterfeiting of cash has become more difficult with the inclusion of special embedded threads in currency and other methods of protection against counterfeiting.

A credit or debit card payment requires that the merchant undertake steps to obtain an authorization of a charge on the debit or credit card. The merchant can thereby be assured that when the merchant submits the charge to the organization which issued the credit or debit card that the charge will not be rejected, resulting in a non-payment to the merchant.

Early charge authorization systems required the merchant to place a phone call to an authorization center, which asked the merchant for the number of the credit card, the identification number for the merchant, the amount of the transaction and other such information. The authorization center then used a computer system to verify that the charge was authorized and then provided the merchant with an identifying authorization number. The merchant then submitted the charge to the credit card issuing organization, usually through the merchant's banking institution, on a paper transaction slip. The authorization number was included, along with written information on the amount of the transaction, the credit card number and the merchant identification number on this paper transaction slip. Usually the customer was also provided with a copy of the transaction slip which the merchant would submit for payment.

Drawbacks of these early systems included the heavy reliance on paper transaction slips and their inherent high cost and the amount of human labor involved in the transaction authorization process. To overcome these drawbacks later systems for credit card transaction authorization have used electronic point-of-sale terminals which automatically obtain an authorization or denial of a credit card transaction.

These point-of-sale terminals typically read a magnetic stripe on the credit card to obtain the credit card number and expiration date and use a keypad for merchant entry of the amount of the charge. The point-of-sale terminal then automatically makes a connection with an authorization processor via a dialup phone line and the public switched telephone network. The point-of-sale terminal transmits information about the desired transaction to the authorization processor.

The authorization processor obtains, from the credit or debit card issuing organization, an authorization or denial of the desired transaction. The authorization processor then transmits information indicative of the authorization or denial of the transaction to the point-of-sale terminal. The point-of-sale terminal then usually displays an authorization code number and also prints a receipt for the customer to sign.

In order to ensure that credit or debit card transactions are properly processed, the organizations which operate the authorization processors require validation of the software program that operates the point-of-sale terminal. This program validation is a lengthy process which can be expensive.

Automated teller machines are another type of financial transaction device which uses a dialup line and the public switched telephone system to contact an authorization processor to obtain an authorization or denial of a financial transaction.

Some merchants use a computerized cash register, in which the opening of the cash drawer is controlled by a computer which is also connected to a point-of-sale credit card authorization terminal. In some cases a magnetic card stripe reader is incorporated directly into the design of these computerized cash registers. The point-of-sale terminal incorporated within these computerized cash registers also uses a dialup phone line connected to the public switched telephone network to contact the authorization processor.

In addition to obtaining authorization to make a charge to a credit or debit card, merchants have also used these point-of-sale terminals as check verification systems. In this case the desired financial transaction is a check verification, and the point-of-sale terminal contacts an authorization processor which is used to obtain an authorization or denial of the acceptance of the customer's check.

A drawback of these types of financial transaction devices is that they require a dialup phone line connected to the public switched telephone network in order to contact the authorization processor. This requirement precludes the use of these devices in a portable fashion, unless a dialup phone line is available at each location where the financial transaction device will be used.

Merchants who would like to accept credit or debit cards but who have mobile or temporary locations, such as roadside stand vendors, pizza delivery companies, limousine or taxicab companies or other mobile vendors do not always have a dialup phone line available to them at their mobile or temporary locations. Thus the point-of-sale transaction terminals which are readily available cannot be used by these merchants.

Another drawback of some of these devices is that the communications between the point-of-sale terminal and the authorization processor are undertaken with the credit card number, cardholder name and other data in plaintext without encoding or efforts to hide this data. The signals transmitted by the point-of-sale terminal may travel dozens or hundreds of miles to the authorization processor. An electronic device which picks up signals off of the dialup phone line anywhere along the length of the transmission path may be able to obtain the cardholder name, credit card number, expiration date and other information since this data is transmitted in plaintext.

Wireless operation of a financial transaction device in a portable fashion would allow merchants who are currently not capable of accepting credit or debit cards as payment for goods or services to accept such cards. Additional benefits may be provided to merchants if the wireless connection of a financial transaction device either provided cost savings to the merchant or provided backup services in the case of a dialup phone line failure. Adding wireless capabilities to an existing financial transaction device further provides a merchant with the option of operating the financial transaction device in either a fixed or portable fashion, as determined to be most beneficial to the merchant.

What is needed is a way to operate a financial transaction device, such as a point-of-sale credit or debit card terminal, or an automated teller machine, in a wireless or portable fashion. Some wireless point-of-sale terminals have been developed. For example, U.S. Pat. No. 5,208,446 describes a wireless point-of-sale terminal. However, these systems require that existing point-of-sale credit card terminals be replaced in order to be used as wireless terminals.

Therefore, it can be appreciated that there is a significant need to operate an existing financial transaction device in a wireless or portable fashion, so that a new program validation will not be required by the organizations which operate the authorization processors. It would be further desirable to add data security capabilities to existing financial transaction devices.

SUMMARY OF THE INVENTION

It is an object of the invention to provide an adaptor which enables an existing financial transaction device to be operated in a wireless fashion.

It is a further object of the invention to provide a wireless financial transaction system which uses an existing financial transaction device which is operated in a wireless fashion.

It is still further object of the invention to provide additional data security for the operation of an existing financial transaction device.

Briefly, the invention provides a wireless adaptor which connects to a financial transaction device, such as a point-of-sale credit card terminal.

The financial transaction device has a phone line port which is compatible with the public switched telephone network, and which transmits signals indicative of a financial transaction. The wireless adaptor provides a phone line interface which is used to interface to the financial transaction device. An audio frequency modem of the wireless adaptor is used to convert the audio frequency signals received from the financial transaction device via the phone line interface into digital data signals, and to convert digital data signals into audio frequency signals which are passed to the financial transaction device via the phone line interface. The wireless adaptor also has a communications processor which connects to the audio frequency modem and to a wireless modem. The communications processor collects digital signals from the financial transaction device and transmits digital signals via the wireless modem. The signals transmitted via the wireless modem are received by a host computer, through various communications means. The host computer then communicates with one or more authorization processors to obtain an authorization or denial of a financial transaction. The host computer transmits information, via various communications means and via a wireless modem, to the communications processor. The communications processor then transmits the information indicative of the authorization or denial of the financial transaction, via the audio frequency modem and the phone line interface, to the financial transaction device.

In another aspect of the invention, a wireless financial transaction system is provided. In the system of the invention a financial transaction device which is capable of operation with the public switched telephone network is used with a wireless adaptor and a wireless modem. A second wireless modem is connected, via various communications means, to a host computer. The wireless adaptor receives signals indicative of a financial transaction from the financial transaction device, and transmits these signals via the wireless modems to the host computer. The host computer connects, through various communications means, to a number of authorization processors. The host computer determines which authorization processor should be used to obtain an authorization or denial of the financial transaction and then connects to the appropriate authorization processor to obtain the authorization or denial of the financial transaction. The host computer then transmits information indicative of the authorization or denial of the transaction to the wireless adaptor, which then transmits the signals indicative of the authorization or denial of the financial transaction to the financial transaction device. Since wireless modems are often portable, the system not only provides a wireless financial transaction system but also a financial transaction system in which the financial transaction device may be operated in a portable manner.

The wireless adaptor and system of the invention may include data compression of the data transmitted via the wireless modems. The communications processor of the wireless adaptor compresses data which is received from the financial transaction device. Such data compression is used to minimize the number of data frames or packets which are transmitted throughout the system, which, in turn, minimizes the frequency of repeated packet or frame transmissions due to data errors.

The wireless adaptor and system of the invention may include encryption to hide the content of the financial transaction messages. The communications processor may encrypt the data received from the financial transaction device. The data encryption is performed to hide the content of the financial transaction messages which are transmitted from the wireless adaptor to the host computer, thereby providing additional data security for the financial transaction device.

DETAILED DESCRIPTION OF THE INVENTION

A financial transaction device may, for example, be a point-of-sale credit card terminal, a point-of-sale debit card terminal, a point-of-sale check authorization terminal, a smart card terminal, a computerized cash register, or an automated teller machine. Each of these devices accepts a credit card, a debit card, a smart card or operator input indicative of a financial transaction, and executes a financial transaction which includes obtaining an authorization of the validity or acceptance of the desired transaction. The credit card, debit card, or checking account number, expiration date, cardholder name and other information may either be entered into the financial transaction device by a human operator entering the data manually, by the financial transaction device reading the identifying data from a magnetic stripe located on the credit or debit card, or by electronically reading data from a smart card.

The present invention provides a wireless adaptor for use with a financial transaction device. The invention will be particularly described when the financial transaction device is a point-of-sale credit card terminal. This is not to limit the scope of the invention, which properly includes other financial transaction devices, but instead to particularly describe a preferred embodiment of the invention.

Figure 1:
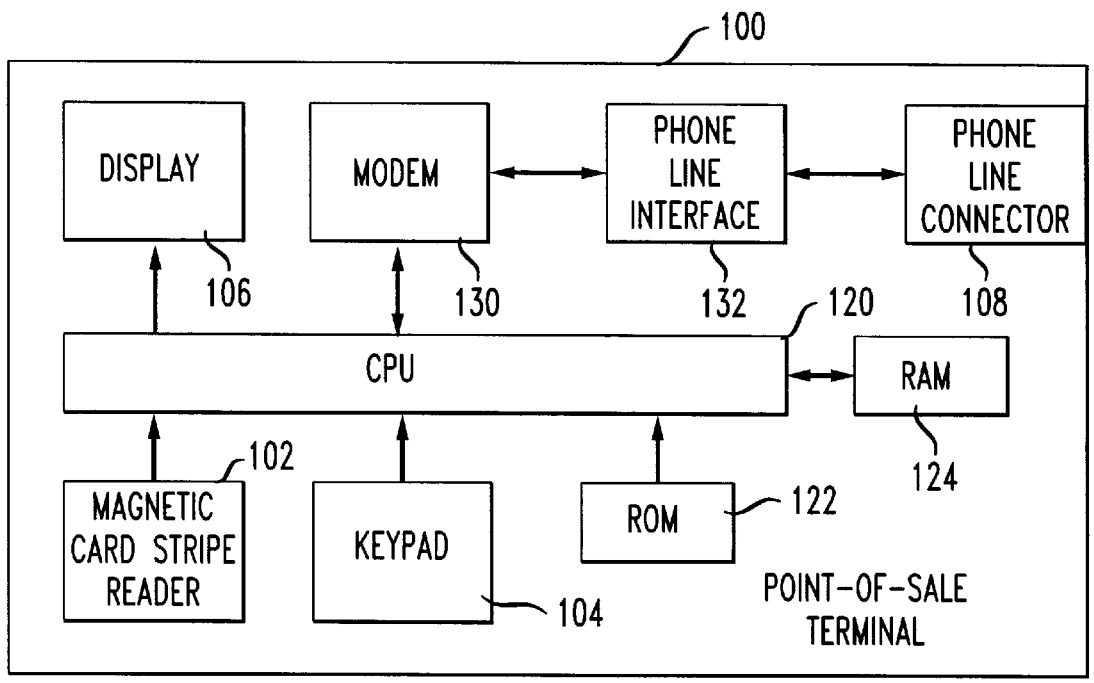
FIG. 1 shows a conventional point-of-sale terminal as an example of a financial transaction device.

As shown in FIG. 1, a conventional point-of-sale credit card terminal 100 (the terminal) has a magnetic card stripe reader 102, a keypad 104, a read-only memory (ROM) 122 for storage of one or more programs, a random access memory 124 (RAM) for data storage, a central processing unit (CPU) 120, a display 106, a modem 130, a phone line interface 132 and a phone line connector 108. The display 106 is a display unit which is capable of displaying alphanumeric characters. The keypad 104 is used by the operator to enter numeric or alphanumeric data. The magnetic card stripe reader 102 is used to read information from a magnetic stripe (not shown) on a credit or debit card (also not shown). The phone line connector 108 is normally used to provide a phone line connection to the public switched telephone network. When the wireless adaptor 200 (see FIG. 2) of the present invention is used with the terminal 100 then the phone line connector 108 is used to connect to the wireless adaptor.

The operation of the terminal 100 will now be described. The merchant receives a credit card from a customer who wishes to use the credit card as payment for the goods and/or services of the merchant. The merchant swipes the credit card (not shown) through the magnetic card stripe reader 102 of the terminal 100, so that the CPU 120 reads the credit card number, expiration date and other information which may be available on the magnetic stripe located on the credit card. The merchant then uses the keypad 104 of the terminal to enter the amount of the purchase and any other information needed to specify the type of transaction.

The terminal 100 then uses its phone line interface 132 to take the phone line connected to the phone line connector 108 and the public switched telephone network off-hook. The off-hook condition is determined by the telephone central office by sensing that the phone line interface passes a DC loop current greater than a specified amount. In the United States a threshold level of 20 milliamps of DC current is often used to determine the off-hook condition.

After taking the phone line off-hook, the terminal 100 dials a predetermined phone number. The terminal may be programmed with different phone numbers which should be dialed. The determination of which phone number to dial may be made by the terminal inspecting the first digit, or several digits, of the credit card number. For example, credit cards issued by VISA International or MasterCard International may be detected by inspection of the first digit of the credit card number. VISA credit card numbers begin with a digit '4', and MasterCard credit card numbers begin with a digit '5'. Other credit card types may be similarly determined by the terminal 100. The terminal 100 thus may dial different phone numbers based on the type of credit card offered by the customer for payment of the merchant's bill for goods and/or services.

The dialing of the phone number by the terminal may be either accomplished with pulse or tone dialing. Dual-tone multifrequency (DTMF) dialing is usually used for greater speed and reliability of dialing.

The terminal 100 may wait for a dial tone signal after taking the phone line off-hook and before dialing the phone number. A dial tone signal is normally provided after the telephone central office detects the off-hook condition, as an indication to the telephone device, in this case the point-of-sale credit card terminal, that dialing may commence. The dial tone usually consists of two tones, such as a 480 hertz tone combined with a 620 hertz tone. However, many terminals may be programmed to not wait for a dial tone before dialing the phone number. Dialing without waiting for a dial tone is often called "blind dialing". Blind dialing may have a speed advantage in that the dialing of the number does not have to wait for the detection of the dial tone.

Figure 2:
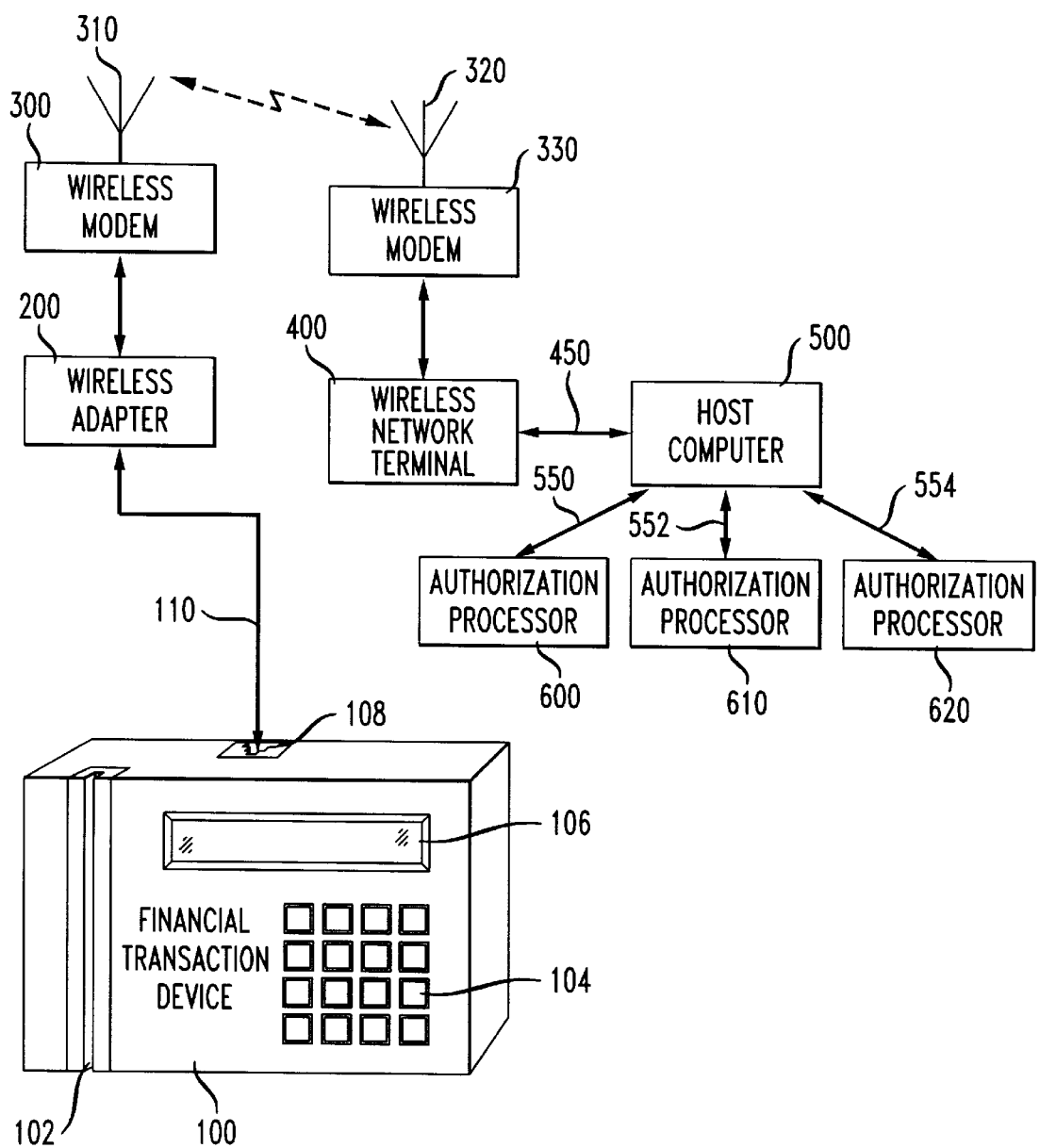
FIG. 2 shows a first embodiment of the system of the invention, including the use of the wireless adaptor with the financial transaction device.

The phone number which is dialed by the terminal 100 is the phone number of a dialup modem which is connected to an authorization processor 600 (see FIG. 2). After dialing the phone number, the terminal 100 waits for a modem connection to be established. The modem of the terminal 100 attempts to connect with the modem of the authorization processor 600. When the modem of the authorization processor 600 takes its phone line off-hook, it delays at least two seconds (the billing delay imposed by federal regulations for operation of modems on the public switched telephone network) and then transmits an answer tone. The modem 130 in the terminal 100 responds to this answer tone with a carrier signal. The modems then undertake a pre-determined sequence which is used to determine the speed and capabilities of the two modems, and a modem connection is thereby established. The modem 130 in the terminal 100 provides a signal to the CPU 120 of the terminal 100 when the modem 130 is ready to be used to transmit and receive digital data.

After the modem connection is established the authorization processor 600 transmits an ENQ character (05 Hex) which indicates to the terminal 100 that the authorization processor 600 is ready to receive data indicative of the requested financial transaction.

When the terminal 100 receives the ENQ character it transmits a data frame of information which contains the credit card number, the expiration date of the credit card, the amount of the desired transaction, a merchant identification number and any other information needed to obtain authorization of the financial transaction. The frame of data may also contain an error checking and correcting code. If the authorization processor 600 does not receive a frame of this type from the terminal the authorization processor may re-transmit the ENQ character until either the authorization processor 600 receives such a frame of data from the terminal 100 or a timeout occurs. In the event of a timeout the authorization processor 600 may return the phone line of its modem back to the on-hook state, thereby breaking the modem connection to the terminal 100.

When the authorization processor 600 does receive a frame of data from the terminal 100 the frame of data is checked for errors using the error checking and correcting code and with other methods. Some authorization processors 600 then transmit an ACK (06 Hex) character to the terminal 100 to acknowledge receipt of the data frame.

The authorization processor 600 then performs database activities and/or contacts a computer of the issuer of the credit card to obtain either an authorization or denial of the transaction. These database activities are well known and need not be described herein. The authorization processor 600 then transmits to the terminal 100, via its modem 130, a frame of data which contains a code for an authorization or a denial of the transaction. This frame of data usually also contains an authorization code number used to identify the authorization of the transaction. This frame also usually contains an error checking and correcting code.

While the authorization processor 600 is performing its database activities and/or contacting the issuer of the credit card the authorization processor 600 may transmit a SYN (16 Hex) character to the terminal 100 to instruct the terminal 100 to continue to wait for a data frame which will be transmitted by the authorization processor 600.

When the terminal 100 receives the data frame from the authorization processor 600 the terminal 100 checks the error checking and correcting code of the data frame, along with other contents of the data frame. If the data frame was received without error the terminal 100 then transmits to the authorization processor 600 an ACK character to acknowledge successful receipt of the data frame. An incorrectly received data frame may cause the terminal 100 to transmit a NAK (15 Hex) character to the authorization processor 600 to inform the authorization processor 600 of the unsuccessful reception of the data frame by the terminal 100. If the NAK character is received by the authorization processor 600 then the data frame may be retransmitted by the authorization processor 600.

After the terminal 100 successfully receives the data frame from the authorization processor 600, as indicated by the transmission of the ACK character from the terminal 100 to the authorization processor 600, the authorization processor 600 sends one or more EOT (04 Hex) characters to the terminal 100 to inform the terminal 100 that the authorization processor 600 is dropping the modem connection. Then the authorization processor 600 breaks the modem connection and places the phone line connected to its modem back into the on-hook state.

After the terminal 100 receives the data frame from the authorization processor 600 the terminal places a message on its display 106 indicative of the authorization or denial of the transaction. If an authorization code is provided in the data frame received by the terminal 100 then it is usually also displayed on the display 106 of the terminal 100. The merchant can then read this message and see if the transaction was authorized or denied. When a transaction is authorized the terminal 100 also places in its RAM 124 a data record which includes the credit card number, the amount of the transaction and any authorization code supplied by the authorization processor 600.

Often the terminal 100 is connected to a printer (not shown), with which a receipt is printed for the customer. Usually the customer signs one copy of the receipt and the merchant retains the other copy of the receipt.

In addition to providing the merchant with an authorization or denial of a financial transaction the terminal 100 provides the merchant with electronic settlement of the credit card transactions which were authorized using the terminal 100.

The settlement process is begun by the merchant using the keypad 104 of the terminal 100 to enter a code which indicates to the CPU 120 of the terminal 100 that the merchant desires to begin the settlement process.

The terminal 100 then, through its phone line interface 132, takes the phone line connected to the terminal 100 off-hook. The terminal 100 then dials a pre-determined phone number which is the phone number of a modem connected to a specific authorization processor 600 acting as a settlement processor.

The terminal 100 then establishes a modem connection between its modem 130 and the modem connected to the settlement processor 600. When the settlement processor 600 transmits an ENQ character to the terminal 100, the terminal 100 responds with a data frame which indicates that the terminal 100 is attempting to perform an electronic settlement.

When the settlement processor 600 receives the data frame which indicates that the terminal 100 is attempting to enter the electronic settlement process the settlement processor 600 sends an ACK character to the terminal 100. When the terminal 100 receives this ACK character it transmits one or more data frames which contain information indicative of the financial transactions which were previously authorized. These data frames are created by the terminal 100 in response to the data records stored in its RAM 124 when each credit card transaction was authorized. The settlement processor 600 sends an ACK character in response to each data frame which was successfully received by the settlement processor 600. The settlement processor 600 may transmit a NAK character to the terminal 100 to instruct the terminal 100 to re-transmit a garbled data frame. When the terminal 100 has transmitted to the settlement processor 600 data frames for all authorized transactions in the RAM 124 of the terminal 100, then the terminal 100 may transmit a special data frame indicative of the ending of the settlement process. Once this frame is acknowledged by the settlement processor 600 then the terminal 100 may break the modem connection, or wait for an EOT character to be transmitted by the settlement processor 600 and then break the modem connection. Then the terminal 100 either removes from its RAM 124 the data records indicative of the authorized transactions or otherwise updates its internal database in RAM 124 to reflect the status of the transactions as posted with the settlement processor 600. The terminal 100 may also require an operator input on keypad 104 in order to perform the removal from its RAM 124 the data records indicative of the authorized transactions.

The settlement processor 600 then presents to the credit card issuers, in a format acceptable to each credit card issuer, data records indicative of the data frames received from the terminal. The credit card transactions are thereby posted to the accounts of the credit card cardholders, to reflect the charges posted onto these accounts.

Referring now to FIG. 2, the wireless system and the use of the wireless adaptor of the present invention will now be described. In the preferred embodiment of the invention the financial transaction device is the terminal 100. The terminal 100 is coupled to the wireless adaptor 200 by cable 110. The wireless adaptor 200 is coupled to a first wireless modem 300, which is coupled to an antenna 310.

A wireless transmission system is used to carry the RF signals from the first wireless modem 300 to a second wireless modem 330 and also from the second wireless modem 330 to the first wireless modem 300. As shown in FIG. 2, the wireless transmission system may comprise a first wireless modem 300 coupled to an antenna 310 and a second wireless modem 330 coupled to a second antenna 320. In this case the free space propagation of the radio waves emitted by the first and second antennas 310 and 320 is used to carry the RF signals between the first and second wireless modems 300 and 330.

The first wireless modem 300 with its associated antenna 310 and the second wireless modem 330 with its associated antenna 320 are coupled to the wireless adaptor 200 of the present invention and to a wireless network terminal 400 respectively. The wireless network terminal 400 is coupled to a communications means 450 which is coupled to a host computer 500. The communications means 450 may be a cable, a dialup modem line, a local area network, a wide area network, a microwave link or other communications means.

The host computer 500 receives and transmits digital signals in a bidirectional fashion via the communications means 450. The signals transmitted by the host computer 500 in this fashion are received by the wireless network terminal 400 and are relayed via the wireless transmission system to the wireless adaptor 200.

The host computer 500 is also coupled to a communications means 550, which is, in turn, coupled to an authorization processor 600. The host computer may be coupled to a plurality of communications means, shown in FIG. 2 as 550, 552 and 554, which are each, in turn, coupled to authorization processors 600, 610 and 620.

The host computer 500 may be of any type which has sufficient processing power and communications capabilities to satisfy system needs. For example, the host computer 500 may be an IBM-PC compatible computer, running either the DOS operating system available from Microsoft Corporation (Redmond, Wash.) or the Windowsʊ operating system also available from Microsoft. Alternative embodiments of the invention may use other computer types or operating systems for the host computer, including a mainframe type computer, a mini-computer or other computer systems and architectures as may be developed from time to time.

The authorization processors 600, 610 and 620 shown in FIG. 2 are the same type of authorization processors to which the terminal 100 would normally make a connection in order to authorize a credit card transaction. The authorization processors 600, 610 and 620 are usually connected to a database and other communications means and other computer systems (not shown) so that the authorization processors 600, 610 and 620 may determine the authorization or denial of a particular financial transaction.

Figure 3:
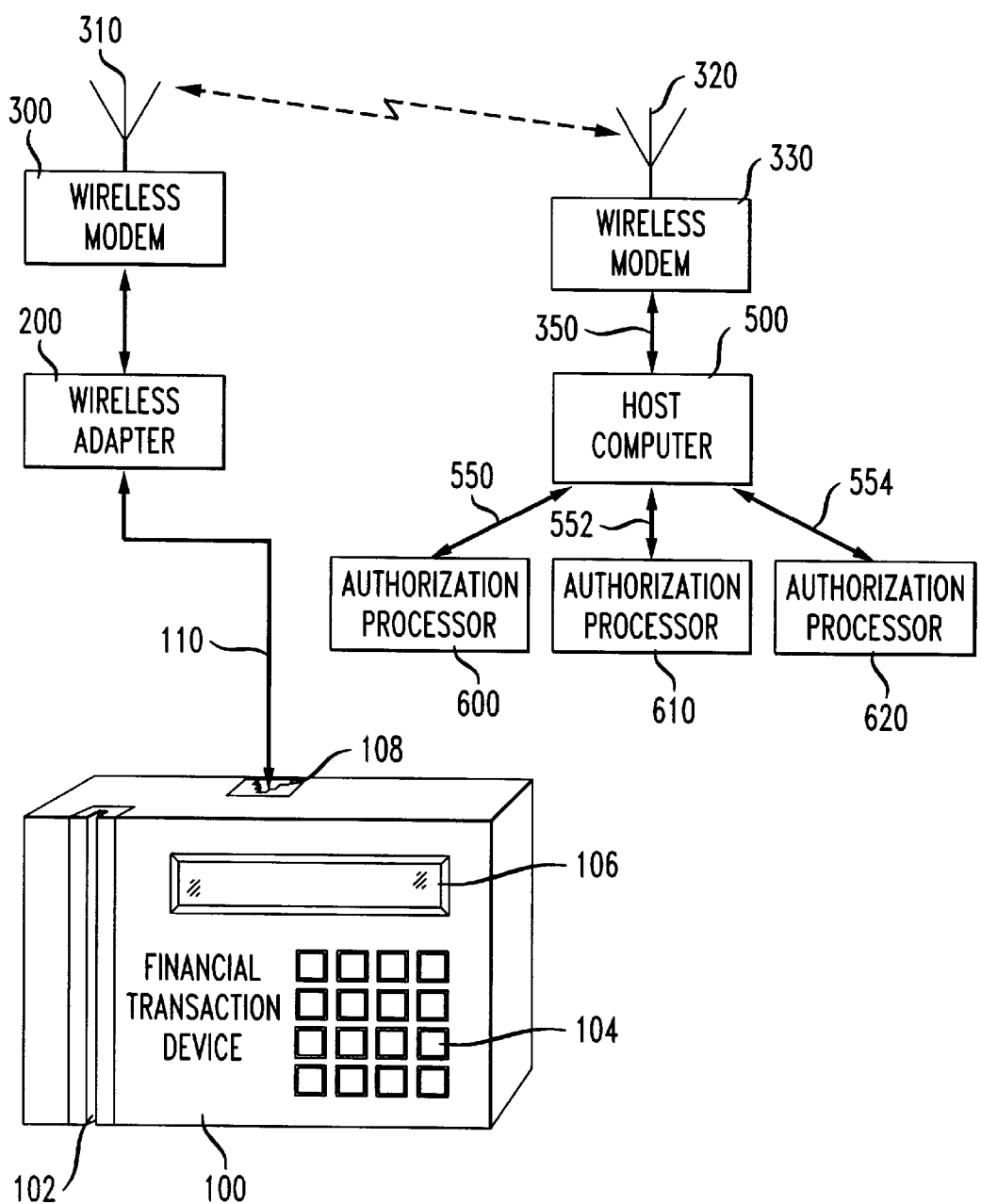
FIG. 3 shows a second embodiment of the system of the invention, in which the host computer has a wireless modem associated with the host computer.

FIG. 3 illustrates an alternative embodiment of the wireless transaction system of the invention. In this embodiment the second wireless modem 330 of the wireless transmission system is coupled to a communications means 350 which, in turn, is coupled directly to the host computer 500 without the wireless network terminal 400 (see FIG. 2).

Figure 4:
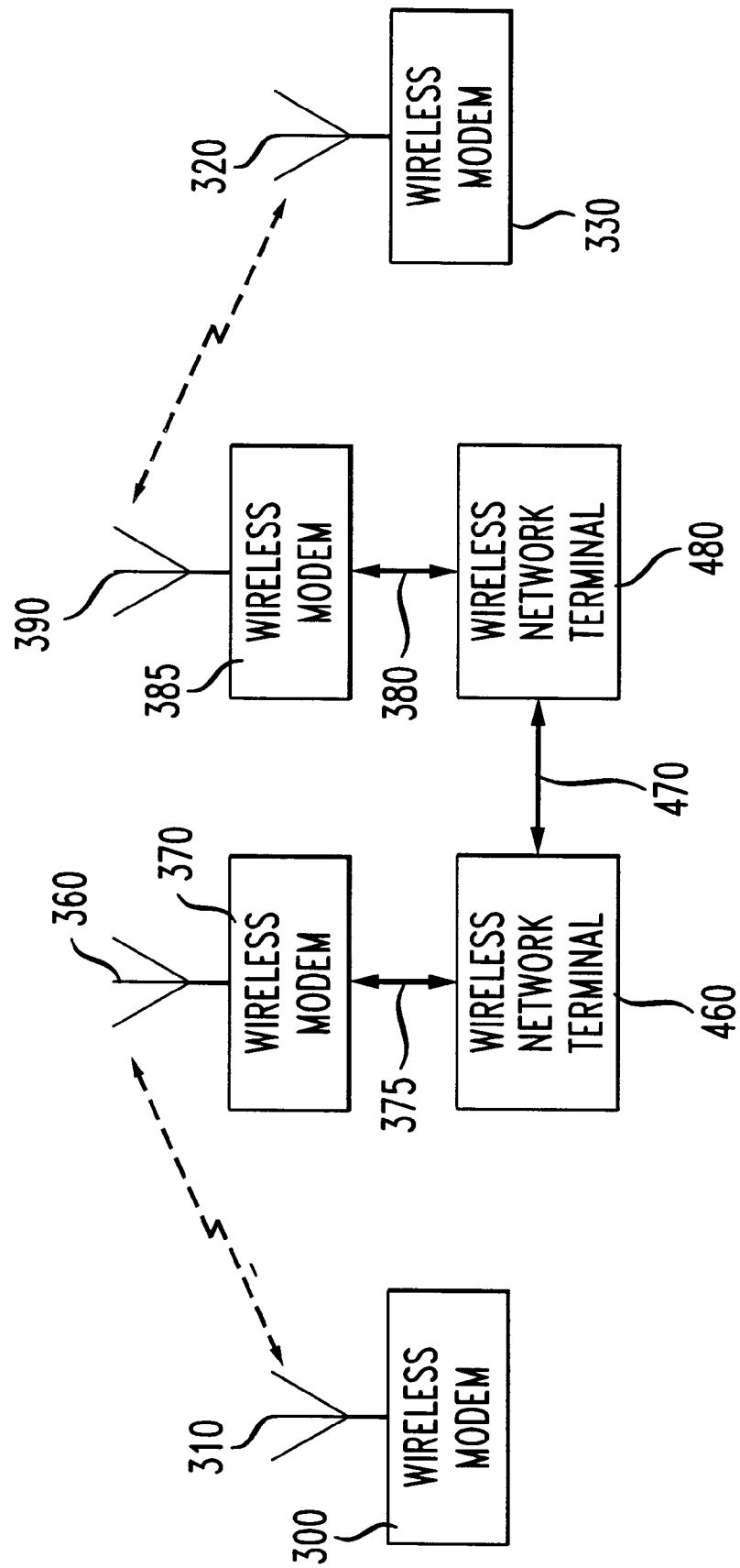
FIG. 4 shows a wireless transmission system which employs two linked wireless network terminals and other elements.

The wireless transmission system may be more complex than those shown in FIGS. 2–3. FIG. 4 illustrates a wireless transmission system which include four wireless modems 300, 370, 385 and 330. The first wireless modem 300 with its associated antenna 310 transmits to the third wireless modem 370 with its associated antenna 360. A wireless network terminal 460 is coupled to the third wireless modem 370. The wireless network terminal 460 is a computer or computer system which transmits and receives digital data via a wireless modem and is also coupled to one or more communications means which enable the wireless network terminal to provide a gateway between wireless devices and computers, computer systems or other wireless network terminals via the communications means associated with the wireless network terminal.

The first wireless network terminal 460 is coupled to a second wireless network terminal 480 via a communications means 470. The communications means 470 may be a cable, a dialup modem, a packet switching network, a local area network, a wide area network, a second wireless transmission system or other communications means (all not shown in detail). The first wireless network terminal 460 is in communication, via its associated wireless modem 370, with the first wireless modem 300. The second wireless network terminal 480 is in communication, via its associated wireless modem 385, with the second wireless modem 330. The coupling of the first wireless network terminal 460 to the second wireless network terminal 480 allows the wireless network terminals to act as a bi-directional relay for the transmissions between the first and second wireless modems 300 and 330. Since the communications means 470 between the first and second wireless network terminals 460 and 480 may span tens or hundreds or even thousands of miles, two distant wireless modems 300 and 330 may be in communication via a wireless transmission system when such a relay system is used. Those skilled in the art will recognize that other forms of wireless communications with or without wireless network connections are possible.

Figure 5:
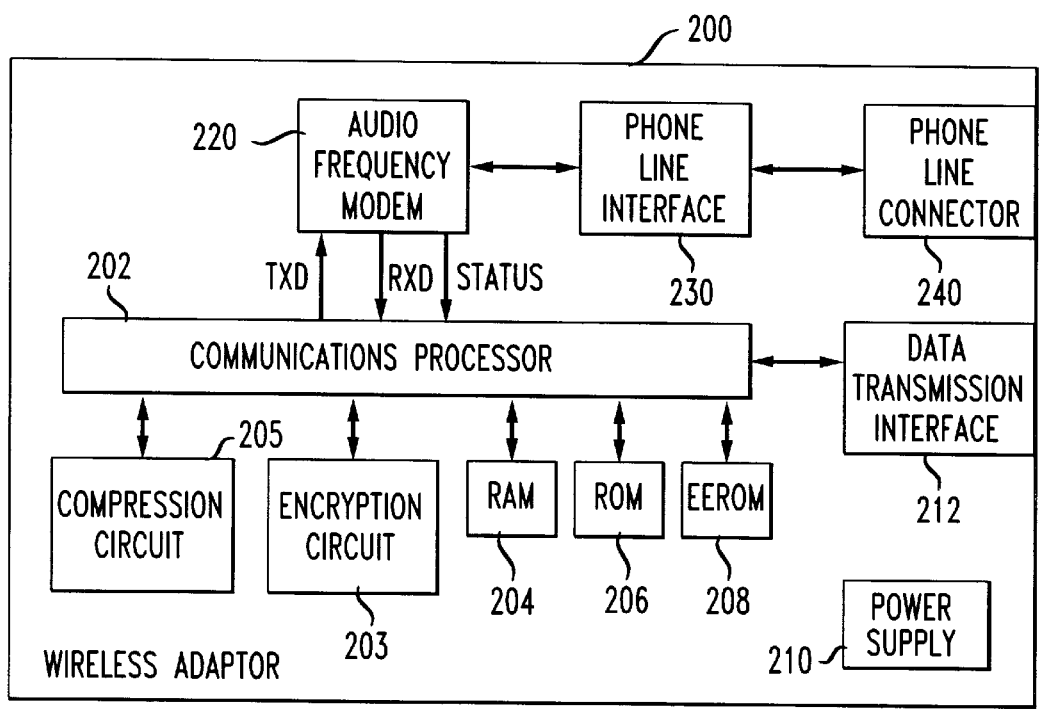
FIG. 5 shows the wireless adaptor of the present invention.

Referring now to FIG. 5, the wireless adaptor 200 of the invention comprises a communications processor 202, a ROM 204, a RAM 206, an EEROM 208, a power supply 210, an audio frequency modem 220, a phone line interface 230, a phone line connector 240, a data transmission interface 212, an encryption circuit 203 and a compression circuit 205.

The communications processor 202 of the wireless adaptor 200 may be any conventional CPU or microcontroller, connected to ROM 204 and RAM 206 by busses in a conventional fashion. The communications processor 202 may be a type 80C31. The ROM 204 may be a type 27C64 or 27C256, and the RAM 206 may be a type 43256, a 32K by 8-bit static RAM. The EEROM 208 may be a type 2864 or 93C46, or other EEROM. Each of these types of parts is manufactured by several semiconductor manufacturers, although the part numbers used by different manufacturers may vary. Dynamic RAM may also be used for RAM 206 of the wireless adaptor of the invention. Also Flash ROM may be used for the ROM 204 of the wireless adaptor of the invention.

The audio frequency modem 220 is coupled to the communications processor 202 by conventional means, such as a TXD signal line, an RXD signal line and a STATUS signal line to the communications processor 202. The audio frequency modem 220 receives digital data which is to be converted into audio frequency signals on the TXD signal line, and transmits digital signals which are recovered from audio frequency signals on the RXD signal line. Most audio frequency modems will also have a STATUS output signal line which provides a status signal which indicates if the audio frequency modem is currently receiving a carrier from another audio frequency modem.

The audio frequency modem 220 of the wireless adaptor 200 is a modem which provides compatibility with the modem 130 of the point-of-sale credit card terminal 100. This modem 130 is usually a 1200 bps modem, which may drop down to 300 bps under adverse data transmission conditions. The audio frequency modem 220 of the wireless adaptor 200 may be type 73K212L as manufactured by Silicon Systems (Tustin, Calif.) or other audio frequency modem. The phone line connector 240 is of the type commonly found on dialup modems and other telephone equipment as well known in the field, commonly referred to as an RJ-11 connector.

Figure 6:
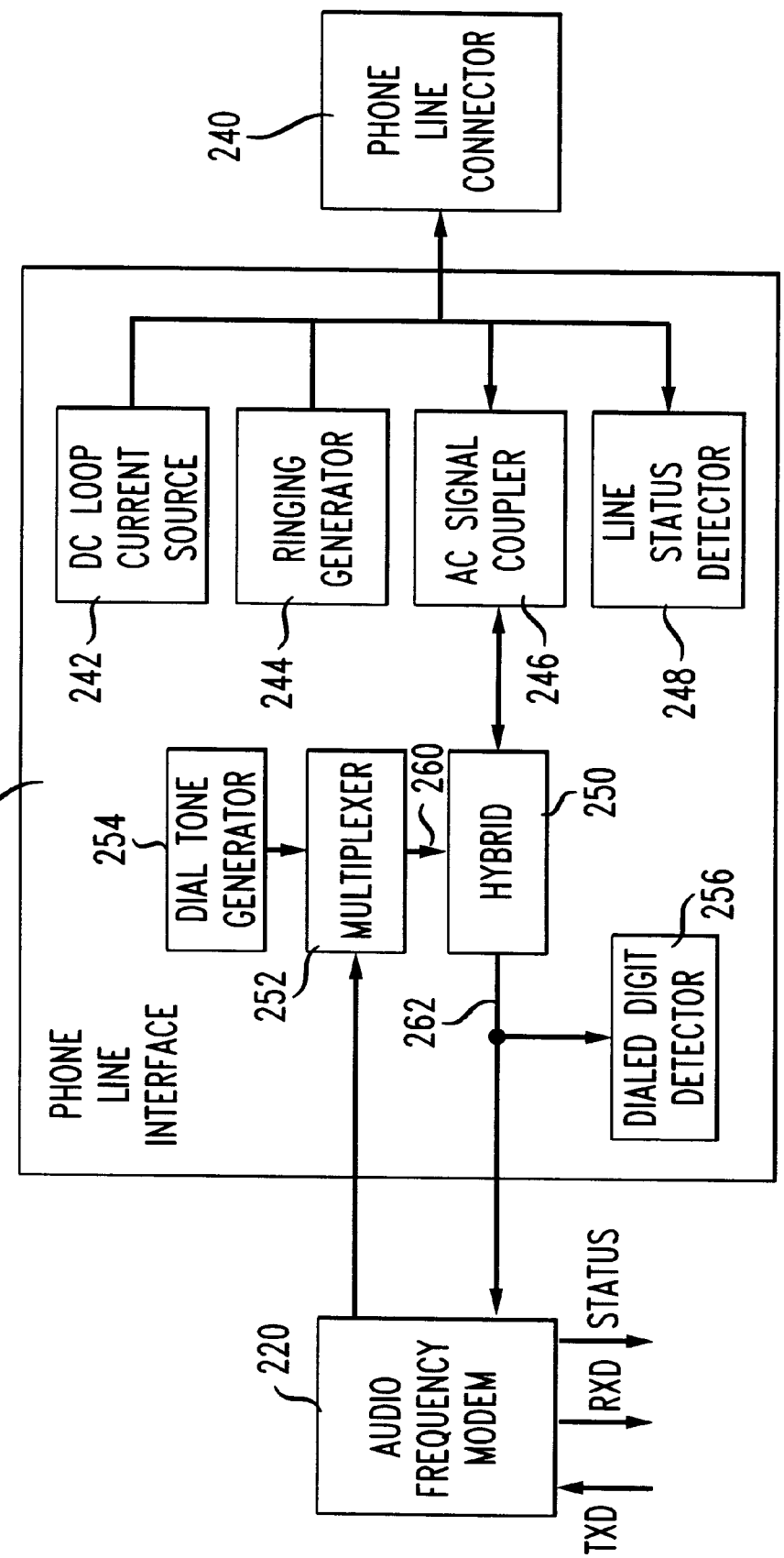
FIG. 6 shows the phone line interface of the wireless adaptor.

The phone line interface 230 of the wireless adaptor 200 is shown in detail in FIG. 6. The phone line connector 240 is coupled to a DC loop current source 242. The DC loop current source 242 is used to power the phone line interface 132 of the terminal 100. The phone line connector 240 is also coupled to a line status detector 248. The line status detector 248 determines if the phone line interface 132 of the terminal 100 is in an on-hook or an off-hook state. The line status detector 248 determines this by monitoring the current flowing from the DC loop current source 242 through the phone line connector 240 and to the phone line interface 132 of the terminal 100. The off-hook line status is detected by sensing that the current being drawn out of the phone line interface 132 of the terminal 100 exceeds a pre-determined threshold level.

The phone line connector 240 is also coupled to a ringing generator 244. The ringing generator 244 may be omitted if the terminal 100 does not take its phone line interface 132 into an off-hook state in response to a ringing signal. The ringing signal may be used by the wireless adaptor 200 to initiate a connection between the wireless adaptor 200 and the terminal 100 in cases where the terminal 100 responds to a ringing signal. Such a connection may be established to download new programs to the terminal 100 via the wireless adaptor 200.

The phone line connector 240 is also coupled to an AC signal coupler 246. The AC signal coupler 246 may be a transformer which passes only AC signals, as well known in the field, or another circuit which passes AC signals will little or no attenuation yet blocks DC signals.

The AC signal coupler 246 is coupled to a hybrid 250. The hybrid 250 is a conventional device that is also known in the field as a 2-to-4 wire converter. The hybrid 250 converts the bi-directional two-wire signal path from the AC signal coupler 246 into two separate, unidirectional two-wire signal paths, the transmit path 260 and the receive path 262, in the fashion well known in the field.

The receive path 262 of the hybrid 250 is coupled to a dialed digit detector 256. The dialed digit detector 256 may consist of a DTMF detector which detects the tones which make up the DTMF digits which are dialed by the terminal 100 via its modem 130. The dialed digit detector 256 is used to detect that the terminal 100 has begun dialing a phone number, and does not necessarily need to determine which particular digits have been dialed. Thus the dialed digit detector 256 may comprise a signal level detector (not shown), which relies on the comparatively high level signal which is used in DTMF signaling. Such a signal level detector may consist of a full-wave bridge and a level comparator.

The receive path 262 of the hybrid 250 is also coupled to the audio frequency modem 220 of the wireless adaptor 200 (see FIG. 2) of the invention. The receive path 262 of the hybrid 250 provides to the audio frequency modem 220 the audio signals which are transmitted via the phone line interface 132 (see FIG. 1) by the modem 130 of the terminal 100, and from which the audio frequency modem 220 recovers the transmitted digital data.

The phone line interface 230 also contains a dial tone generator 254. The dial tone generator 254 is coupled to a multiplexer 252. The audio frequency modem 220 is also coupled to the multiplexer 252. The multiplexer 252 is used to select between the output from the dial tone generator 254 and the output from the audio frequency modem 220, and to provide the selected signal to the transmit path 260 to the hybrid 250. When the output of the dial tone generator 254 is coupled to the transmit path 260 of the hybrid 250 by the multiplexer 252 then the dial tone signal which is generated by the dial tone generator 254 is passed by the hybrid 250 to the AC signal coupler 246 and is thereby passed to the phone line connector 240 and to the phone line interface 132 (see FIG. 1) of the terminal 100. If the terminal 100 can blind dial and does not require a dial tone to be supplied in order to begin dialing, the dial tone generator 254 may be omitted from the phone line interface 230 of the wireless adaptor 200 of the invention.

When the multiplexer 252 selects the output of the audio frequency modem 220 to be provided to the transmit path 260 of the hybrid 250 then the modem output is passed by the hybrid 250 to the AC signal coupler 246 and is thereby passed to the phone line connector 240 and to the phone line interface 132 (see FIG. 1) of the terminal 100, thus allowing the audio frequency modem 220 of the wireless adaptor 200 of the invention to establish a modem connection with the modem 130 of the terminal 100.

Encryption circuit 203 is coupled to communications processor 202. Data which is to be encrypted is transmitted from communications processor 202 to encryption circuit 203, and the encrypted data is transmitted from encryption circuit 203 to communications processor 202. Encryption circuit 203 may encrypt the data using simple bit XORing, bit order scrambling, DES, RSA or other conventional encryption methods. Encryption circuit 203 is also used to decrypt data which communications processor 202 receives. Encryption circuit 203 may be omitted if no data encryption is to be performed on the data which is received or transmitted by communications processor 202. Additionally, encryption circuit 203 may be omitted if communications processor uses a software program stored in ROM 204 to perform any desired encryption.

Figure 7:
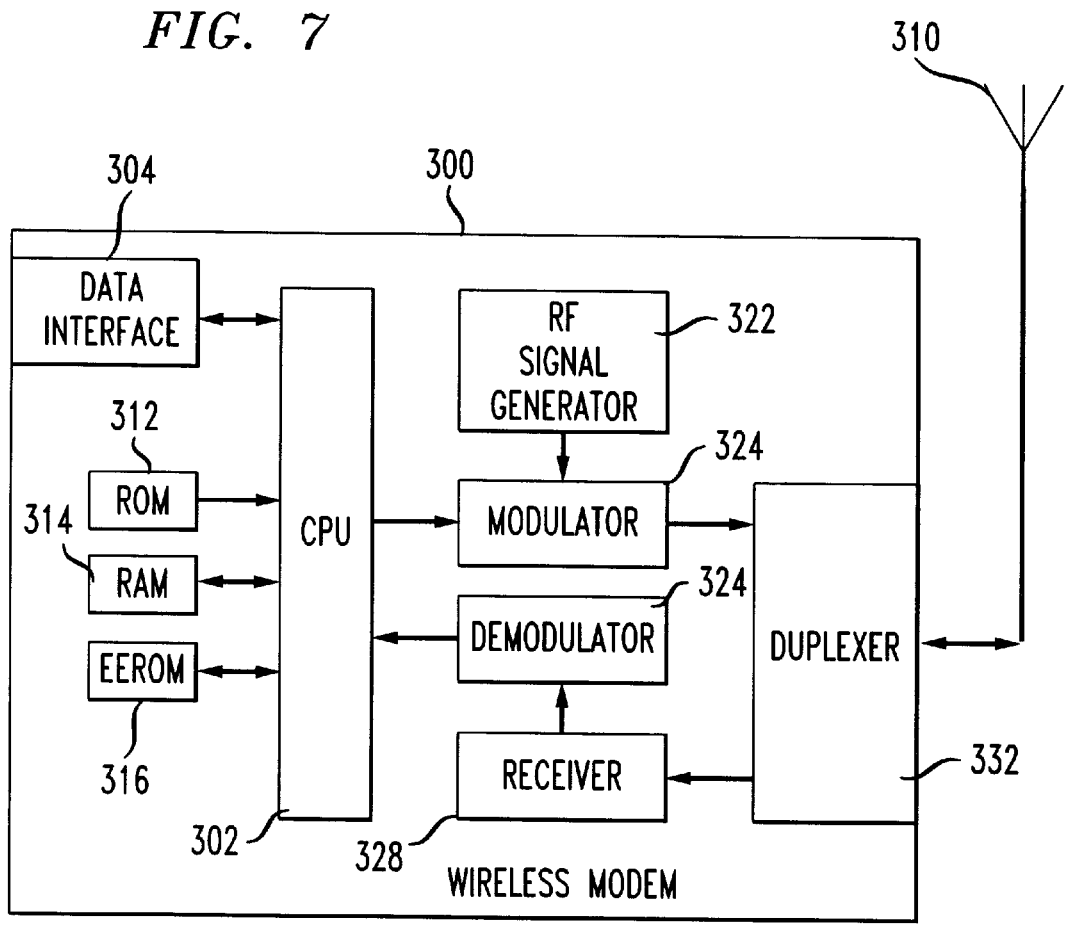
FIG. 7 shows a typical wireless modem.

Compression circuit 205 is coupled to communications processor 202. Data which is to be compressed is transmitted from communications processor 202 to compression circuit 205, and the compressed data is transmitted from compression circuit 205 to communications processor 202. Compression circuit 205 may compress the data using simple bit packing, removal of redundant data fields or other conventional data compression methods. Compression circuit 205 is also used to decompress data which communications processor 202 receives. Compression circuit 205 may be omitted if no data compression is to be performed on the data which is received or transmitted by communications processor 202. Additionally, compression circuit 205 may be omitted if communications processor uses a software program stored in ROM 204 to perform any desired data compression. FIG. 7 shows a typical wireless modem 300 which may be used with the wireless adaptor 200 of the present invention. The wireless modem 300 may be, for example, a Cellular Digital Packet Data (CDPD) modem or other wireless modem. The wireless modem 300 has a data interface 304 which receives signals and performs a serial-to-parallel conversion, and which also performs a parallel-to-serial conversion and transmits signals. The wireless modem 300 has a CPU 302 which is coupled to the data interface 304. The CPU 302 is also coupled to a ROM 312 for program storage, a RAM 314 for data storage and an EEROM 316 for configuration data storage.

The data interface 304 receives signals as a serial data stream and converts the serial data stream signals to parallel data signals which are passed to the CPU 302. The CPU 302 may also pass parallel data to the data interface 304 and the data interface 304 converts the parallel data into a serial stream of data which is then transmitted by the data interface 304.

The CPU 302 of the wireless modem 300 receives the parallel data signals as a stream of characters from the data interface 304 and collects the characters in its RAM 314. Once the CPU 302 has collected a predetermined number of characters or the time period between two received characters exceeds a pre-determined time limit or when the CPU 302 receives a pre-determined specific character then the CPU 302 formats a packet and transmits the packetized data. The packet contains a header with information which identifies the particular wireless modem 300, the collected data, and an error checking and correcting code.

The wireless modem 300 contains an RF signal generator 322 and a modulator 324. The modulator 324 has a signal input which receives digital signals. The CPU 302 of the wireless modem 300 is coupled to the modulator 324. When transmitting digital data, such as a packet containing the collected frame of data received by the CPU 302, the CPU 302 sends digital signals to the modulator 324. The RF signal generator 322 and the modulator 324 produce a modulated RF signal, in the manner well practiced in the field.

The output of the modulator 324 is the modulated RF signal, which is applied to the input of a duplexer 332.

The duplexer 332 is coupled to an antenna 310, which is external to the wireless modem 300. The duplexer 332 is also coupled to a receiver 328 which is part of the wireless modem 300. The duplexer 332 acts as an automatic transmit/receive switch. When the modulated RF signal is present the duplexer 332 automatically connects the antenna 310 to the modulator 324, providing the output of the modulator 324 to the antenna 310. When the modulated RF signal is not present the duplexer 332 automatically connects the antenna 310 to the receiver 328 of the wireless modem 300.

The receiver 328 of the wireless modem 300 receives a modulated RF signal from the antenna 310, via the duplexer 332. The receiver 328 is coupled to a de-modulator 326. The receiver 328 converts the modulated RF signal into a second RF signal which is provided to the demodulator 326. The de-modulator 326 recovers from the second RF signal the digital data encoded therein. The CPU 302 of the wireless modem 300 is coupled to the de-modulator 326. The digital data output of the de-modulator 326 is provided to the CPU 304 of the wireless modem 300.

The digital data received by the CPU 302 may comprise a data packet In this case the CPU 302 extracts from the data packet the data contained therein, and then transmits the digital data via the data interface 304.

As previously discussed, the wireless modem 330 is coupled to the wireless network terminal 400 (see FIG. 2) or directly to the host computer 500 (see FIG. 3) by the communications means 350. As shown in FIGS. 8A, 8B, 8C and 8D, the communications means 350 which is coupled to the second wireless modem 330 and the host computer 500 may take many forms.

Figure 8A:
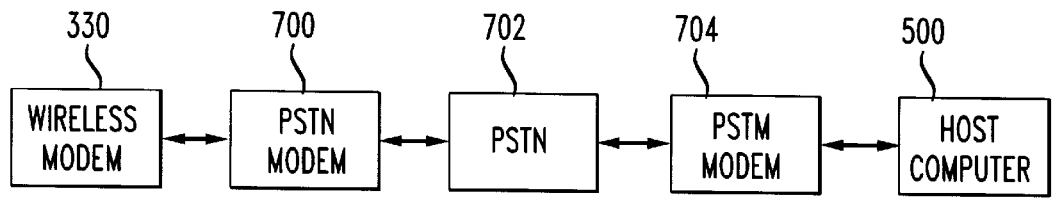
FIGS. 8A, 8B, 8C and 8D show examples of the communications means of the present invention between the second wireless modem and the host computer.

In FIG. 8A the communications means 350 is shown as a first modem 700 which is compatible with the public switched telephone network (PSTN) 702 and coupled to the second wireless modem 330, the public switched telephone network 702, and a second modem 704 compatible with the public switched telephone network 702 coupled to the host computer 500.

Figure 8B:
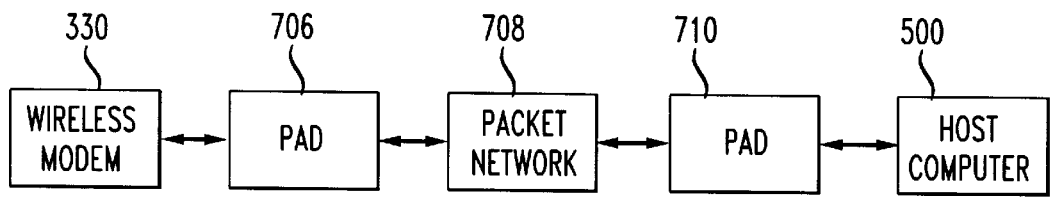

In FIG. 8B the communications means 350 is shown as a first packet assembler and disassembler 706 compatible with a packet network 708 coupled to the second wireless modem 330, a packet network 708, and a second packet assembler and disassembler 710 compatible with the packet network 708 coupled to the host computer 500.

Figure 8C:
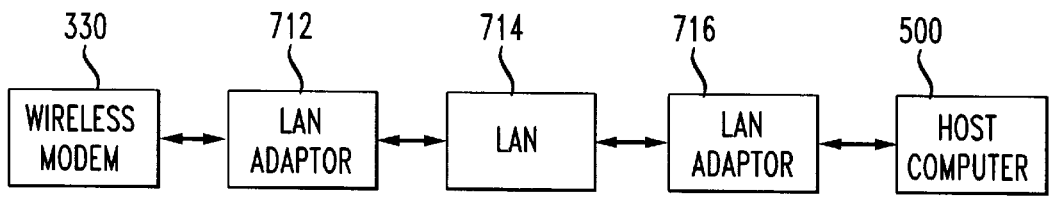

In FIG. 8C the communications means 350 is shown as a first local area network adaptor 712 which is compatible with a local area network 714 coupled to the second wireless modem 330, a local area network 714, and a second local area network adaptor 716 compatible with the local area network 714 coupled to the host computer 500.

Figure 8D:
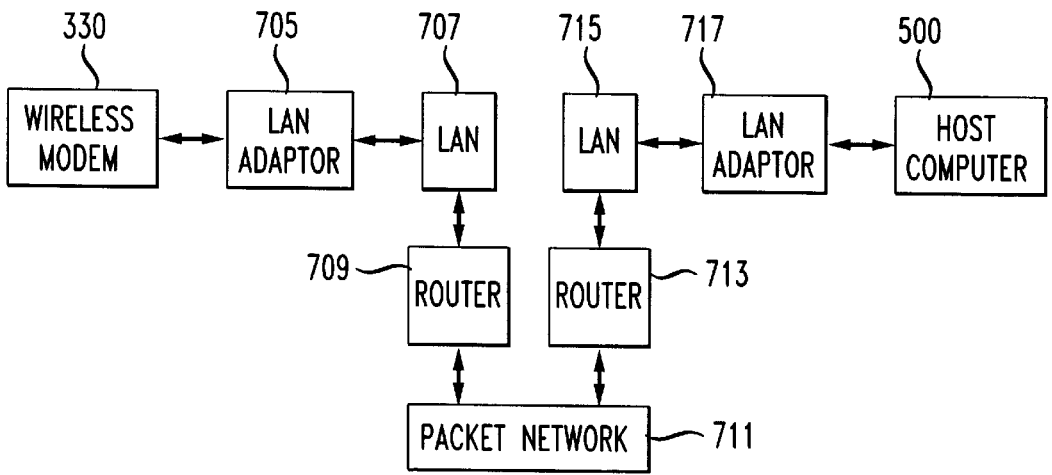

In FIG. 8D the communications means 350 is shown as a conventional high-speed wide area network. The wide area network comprises a first local area network adaptor 705 coupled to the second wireless modem 330 and a first local area network 707, a first local area network 707, a first router 709 coupled to first local area network 707 and compatible with a packet network 711, a packet network 711, a second router 713 coupled to packet network 711 and a second local area network 715, a second local area network 715, a second local area network adaptor 717 coupled to second local area network 715 and the host computer 500.

Figure 9A:
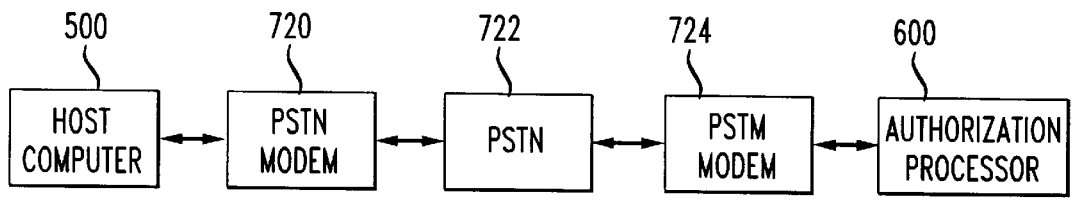
FIGS. 9A, 9B, 9C and 9D show examples of the communications means of the present invention between the host computer and an authorization processor.

As shown in FIGS. 9A, 9B, 9C and 9D, the communications means 550 which couples the host computer 500 and authorization processor 600 may take many forms. In FIG. 9A the communications means 550 is shown as a first modem 720 which is compatible with the public switched telephone network 722 and coupled to the host computer 500, the public switched telephone network 722, and a second modem 724 compatible with the public switched telephone network 722 coupled to the authorization processor 600.

Figure 9B:
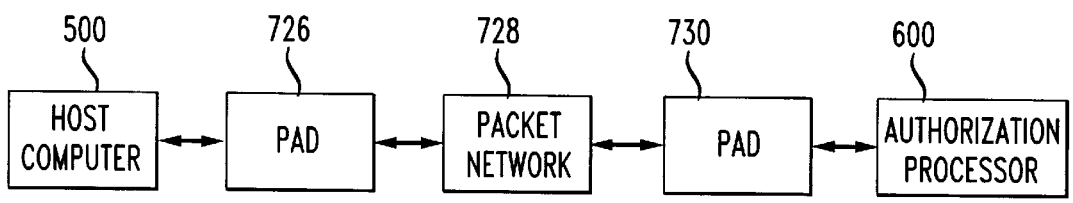

In FIG. 9B the communications means 550 is shown as a first packet assembler and disassembler 726 compatible with a packet network 728 coupled to the host computer 500, a packet network 728, and a second packet assembler and disassembler 730 compatible with the packet network 728 coupled to the authorization processor 600.

Figure 9C:
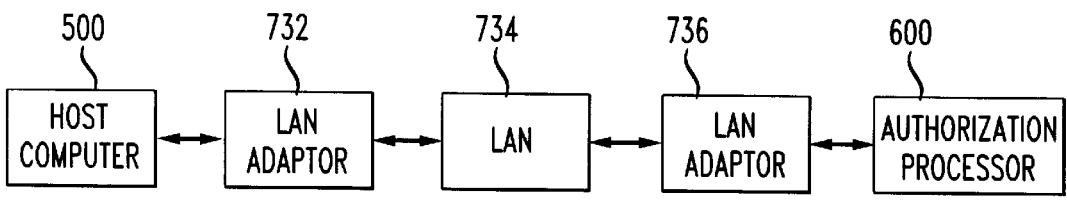

In FIG. 9C the communications means 550 is shown as a first local area network adaptor 732 which is compatible with a local area network 734 coupled to the host computer 500, a local area network 734, and a second local area adaptor 736 compatible with the local area network 734 coupled to the authorization processor 600.

Figure 9D:
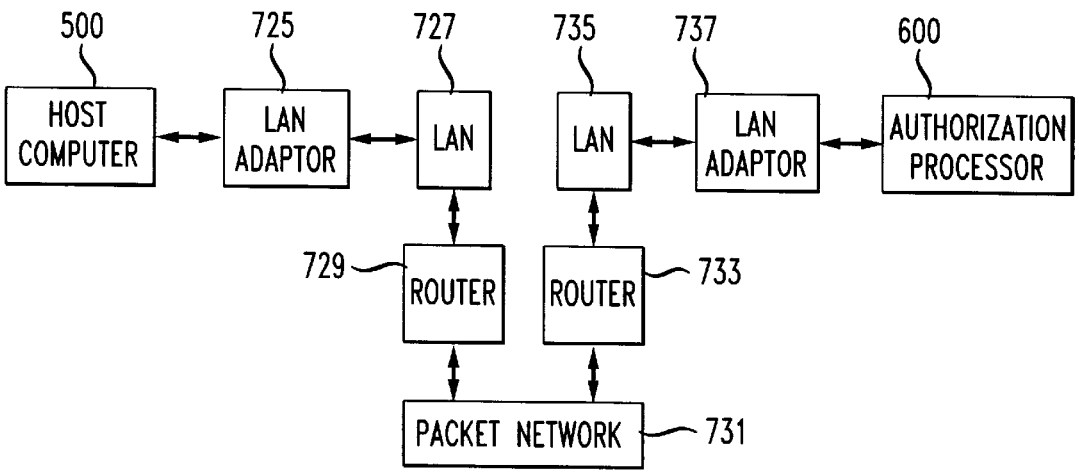

In FIG. 9D the communications means 550 is shown as a conventional high-speed wide area network. The wide area network comprises a first local area network adaptor 725 coupled to the host computer 500 and a first local area network 727, a first local area network 727, a first router 729 coupled to first local area network 727 and a packet network 731, a packet network 731, a second router 733 coupled to packet network 731 and a second local area network 735, a second local area network 735, a second local area network adaptor 737 coupled to second local area network 735 and authorization processor 600.

Figure 10:
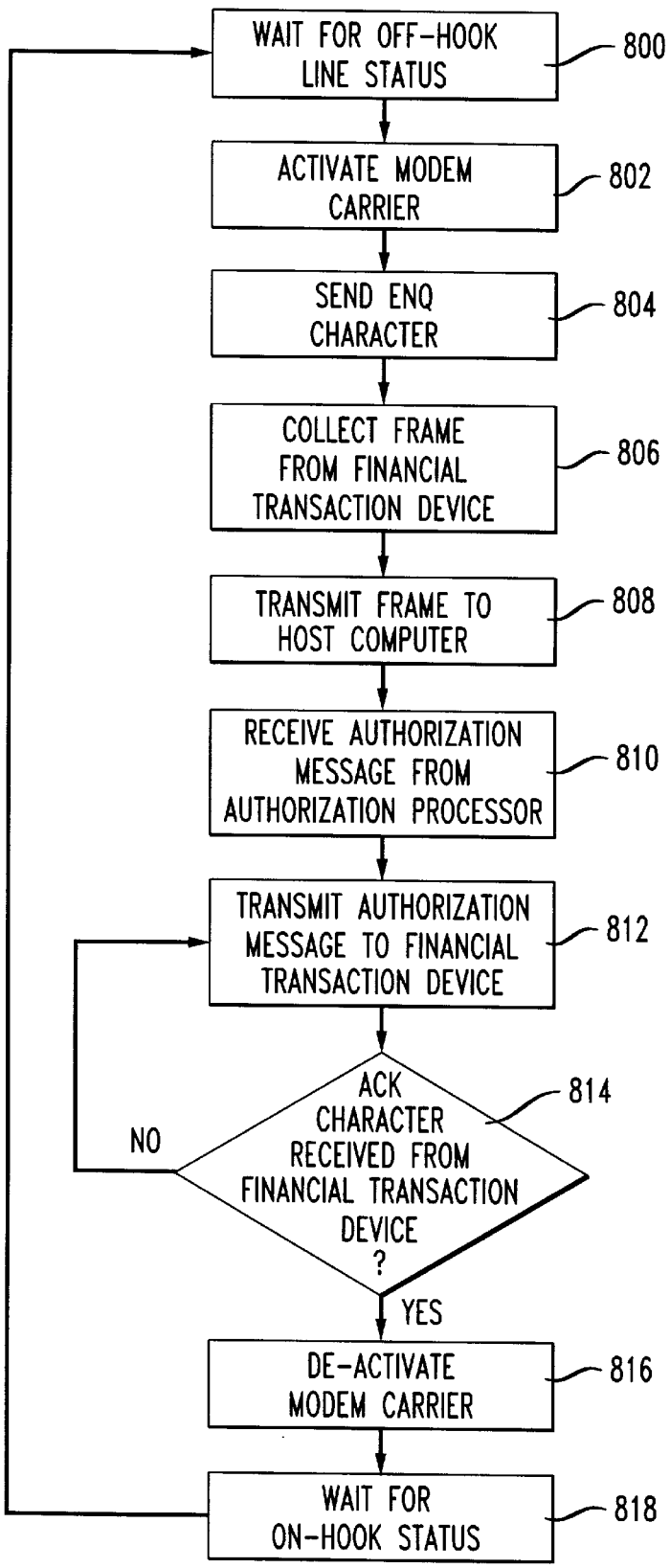
FIG. 10 shows a flow chart of the steps taken according to the present invention in the authorization of a financial transaction.

Referring now to the flow chart in FIG. 10, the operation of the wireless adaptor 200 when used with the terminal 100 will now be discussed. In step 800, the wireless adaptor 200 first waits for an off-hook line status of the terminal 100. The phone line interface 230, particularly the line status detector 248 thereof, detects that a minimum amount of DC loop current is being pulled by the terminal 100 from the DC loop current source 242 of the phone line interface 230 to determine the off-hook line status state.

Figure 11:
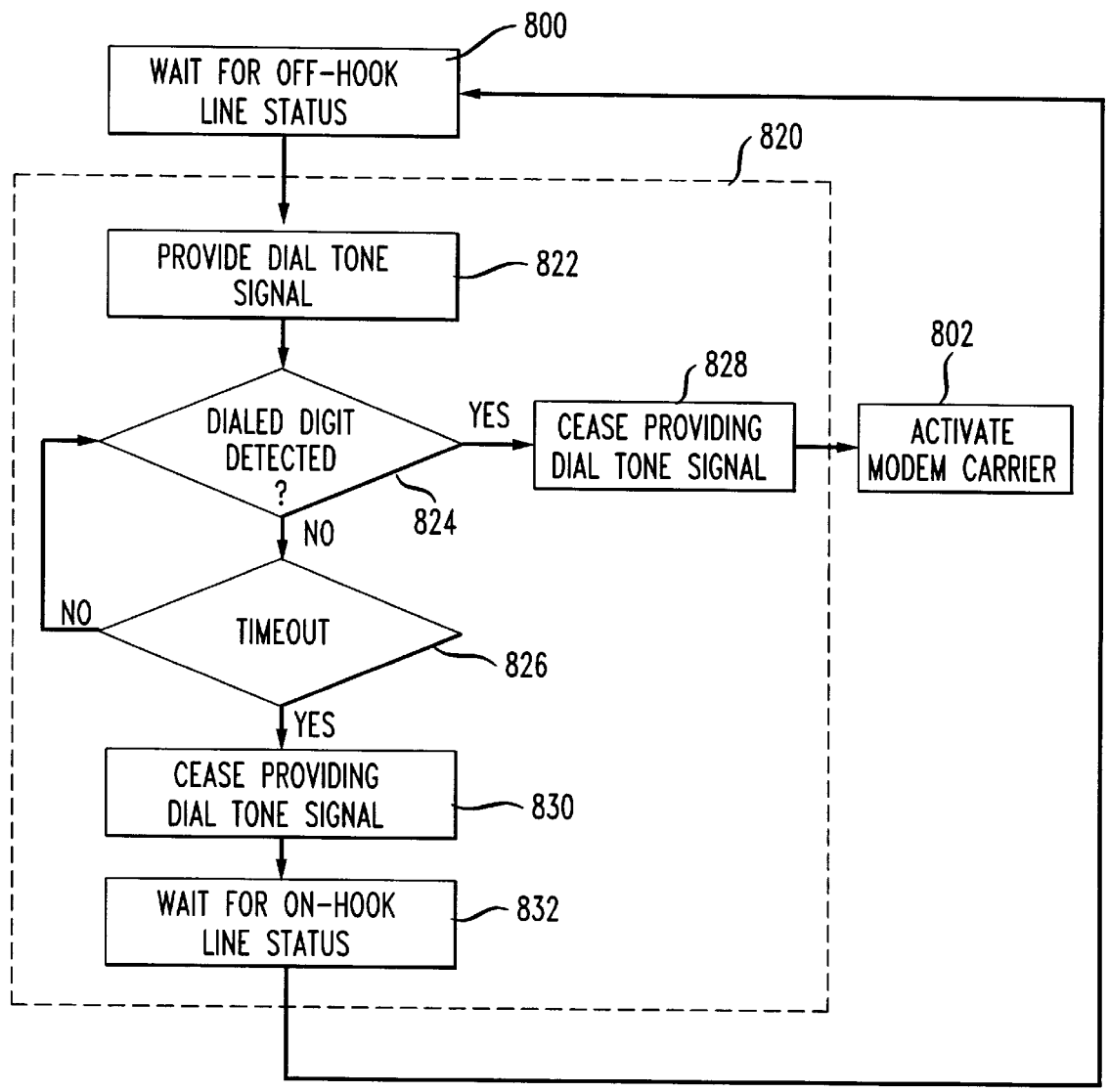
FIG. 11 shows a flow chart of optional steps taken by the wireless adaptor when the wireless adaptor provides a dial tone signal.

When the wireless adaptor 200 detects the off-hook line status in step 800, the wireless adaptor 200 then may perform optional steps 820, as shown in FIG. 11, in which the wireless adaptor 200 provides a dial tone signal in step 822 via the dial tone generator 254, the multiplexer 252, the hybrid 250 and AC signal coupler 246 of the phone line interface 230. In these optional steps 820 the wireless adaptor 200 then provides the dial tone until either a dialed digit is detected in step decision 824 with the dialed digit detector 256 of the phone line interface 230, or until a timeout occurs in step 826. When either a dialed digit is detected by decision 824 or a timeout occurs in step 826 the wireless adaptor 200 ceases providing the dial tone signal as shown in steps 828 and 830, respectively. If the timeout occurs in step 826, the wireless adaptor 200 waits until the phone line interface of the terminal enters an on-hook state in step 832 and then returns to the state of waiting for an off-hook line status in step 800, as shown in FIG. 10.

It should be noted that the preferable modes of operation of the terminal 100 are to set the terminal to blind dial so that the optional steps 820 are not needed, and also to set the terminal 100 to dial as short a phone number as the terminal may be programmed to dial, to shorten the time required to establish a modem connection between the modem 130 (see FIG. 1) of the terminal 100 and the audio frequency modem 220 (see FIG. 5) of the wireless adaptor 200.

Referring again to FIG. 10, the wireless adaptor 200 activates the modem carrier of the audio frequency modem as shown in step 802. The wireless adaptor 200 couples the audio output signals of the audio frequency modem 220 to the phone line interface 132 of the terminal 100 by selecting, via multiplexer 252, the audio output signals of the modem to be provided to the hybrid 250 and thereby to the AC signal coupler 246 and the phone line connector 240 of the wireless adaptor 200. Since the use of the terminal 100 with the wireless adaptor 200 is not a usage of the terminal on the public switched telephone network, the two-second billing delay usually required by the answering modem is not required. The audio frequency modem 220 provides its carrier signal without the two-second delay to provide a faster connection between the terminal 100 and the wireless adaptor 200.

Once the modem carriers are established, the wireless adaptor 200 sends an ENQ (05 Hex) character to the terminal 100 via the audio frequency modem 220 and the phone line interface 230 in step 804. The wireless adaptor 200 then waits for and collects a frame of data from the terminal in step 806. As discussed earlier, this frame is indicative of either a request to authorize a financial transaction or is used to perform electronic settlement of authorized transactions. Additionally the data frame could be indicative of a request for a software update download.

In step 808 the wireless adaptor 200 transmits this data frame to the host computer 500 via the wireless modem 300, the wireless transmission system, a second wireless modem 330 and the various communications means and/or wireless network terminals associated with a particular embodiment of the invention.

The wireless adaptor 200 then waits for a data frame from the host computer which is indicative of the authorization or denial of the requested financial transaction in step 810, or which acknowledges receipt of the data being transferred when executing an electronic settlement process. The wireless adaptor 200 transmits the received data frame to the terminal in step 812.

In decision 814 the wireless adaptor 200 waits for an ACK (06 Hex) character from the terminal 100 which indicates that the terminal 100 successfully received the data frame. In a case where the terminal 100 does not normally provide an ACK character in response to a successfully received data frame the wireless adaptor 200 skips this decision step and does not wait for such a character. If a NAK character is received when an ACK character is expected, then the wireless adaptor 200 may re-transmit the data frame until an ACK character is received.

The wireless adaptor 200 then de-activates the modem carrier in step 816, which forces the terminal 100 to enter an on-hook line state. The wireless adaptor 200 waits for the on-hook line status indicative of the on-hook line state in step 818. When this status is detected the wireless adaptor 200 then again enters a state wherein the system awaits the detection of a new off-hook line status in step 800, and the steps of the flow chart of FIG. 10 are then repeated.

When executing an electronic settlement, the wireless adaptor 200 waits after receiving the ACK character from the terminal 100 to determine if a new data frame is transmitted from the terminal 100. In this case the wireless adaptor 200 returns to the step of collecting the data frame in step 806, so that all data frames of the electronic settlement are transmitted to the host computer as shown in step 808. When no more data frames are to be transmitted the wireless adaptor 200 then de-activates the modem carrier in step 816 as when a single financial transaction is being authorized.

Figure 12:
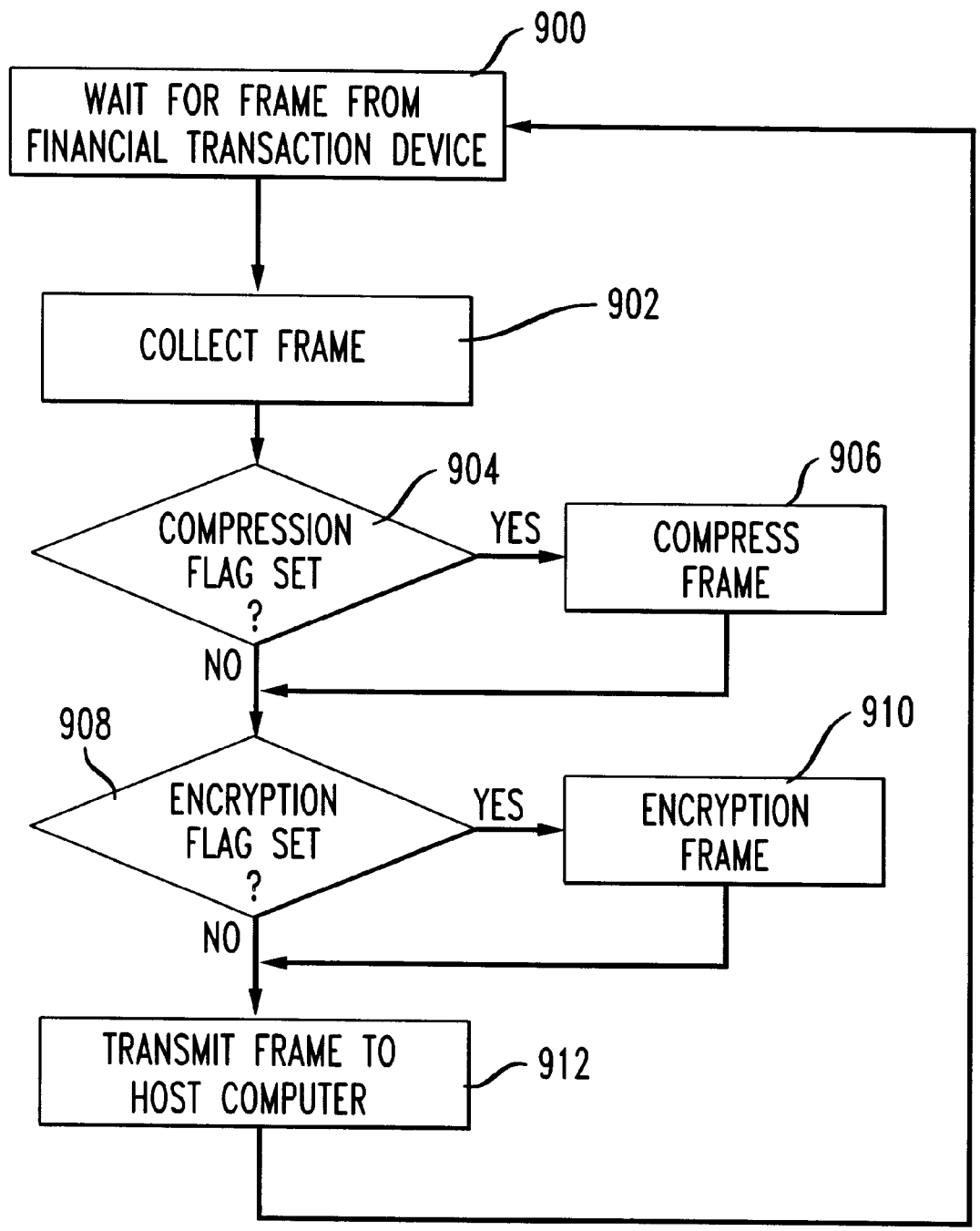
FIG. 12 shows a flow chart of the steps taken according to the present invention in the compression and/or encryption of the data frame received from the financial transaction device.

As shown in FIG. 12, the wireless adaptor 200 may compress and/or encrypt the data frame which is received by the wireless adaptor 200 from the terminal 100.

In step 900 the wireless adaptor 200 waits for a data frame from the terminal 100 and collects the data frame in step 902. If a compression flag is set in the ROM or RAM of the wireless adaptor 200 then the data is to be compressed. The wireless adaptor 200 checks the compression flag in step 904 and either compresses the data frame in step 906 or does not compress the data frame. The compression which is used is selected to provide maximal compression of the data frame without causing an unreasonable delay of the data transmission. Such compression may include bit packing, table or dictionary compression or other compression methods as well known and practiced in the field or as developed from time to time. Data compression is used to minimize the number of packets or data frames which need to be transmitted throughout the system, thereby minimizing the number of retries due to garbled packets or data frames.

If an encryption flag is set in the ROM or RAM of the wireless adaptor 200 then the data is to be encrypted. The wireless adaptor 200 checks the encryption flag in step 908 and either encrypts the data frame in step 910 or does not encrypt the data frame. The encryption which is used is intended to hide the data from a casual observer or attempt to discover the contents of the data frame. Such encryption may be simple, such as XORing the data frame with a pattern, scrambling the bit order of the data frame or other simple data hiding mechanisms, or may be complex, such as the application of DES or RSA encryption to the data, as well known and practiced in the field or as developed from time to time.

It should be noted that the data may be transmitted in plaintext (no compression or encryption), transmitted as compressed data (only compressed, with no encryption), transmitted as encrypted data (only encrypted, with no compression) or transmitted as encrypted compressed data (both compression and encryption performed on the data). After the data frame has been compressed and/or encrypted it is then transmitted to the host computer, as shown in step 912. The steps of compressing and encrypting the data illustrated in FIG. 11 may be performed with either step being taken first.

Figure 13:
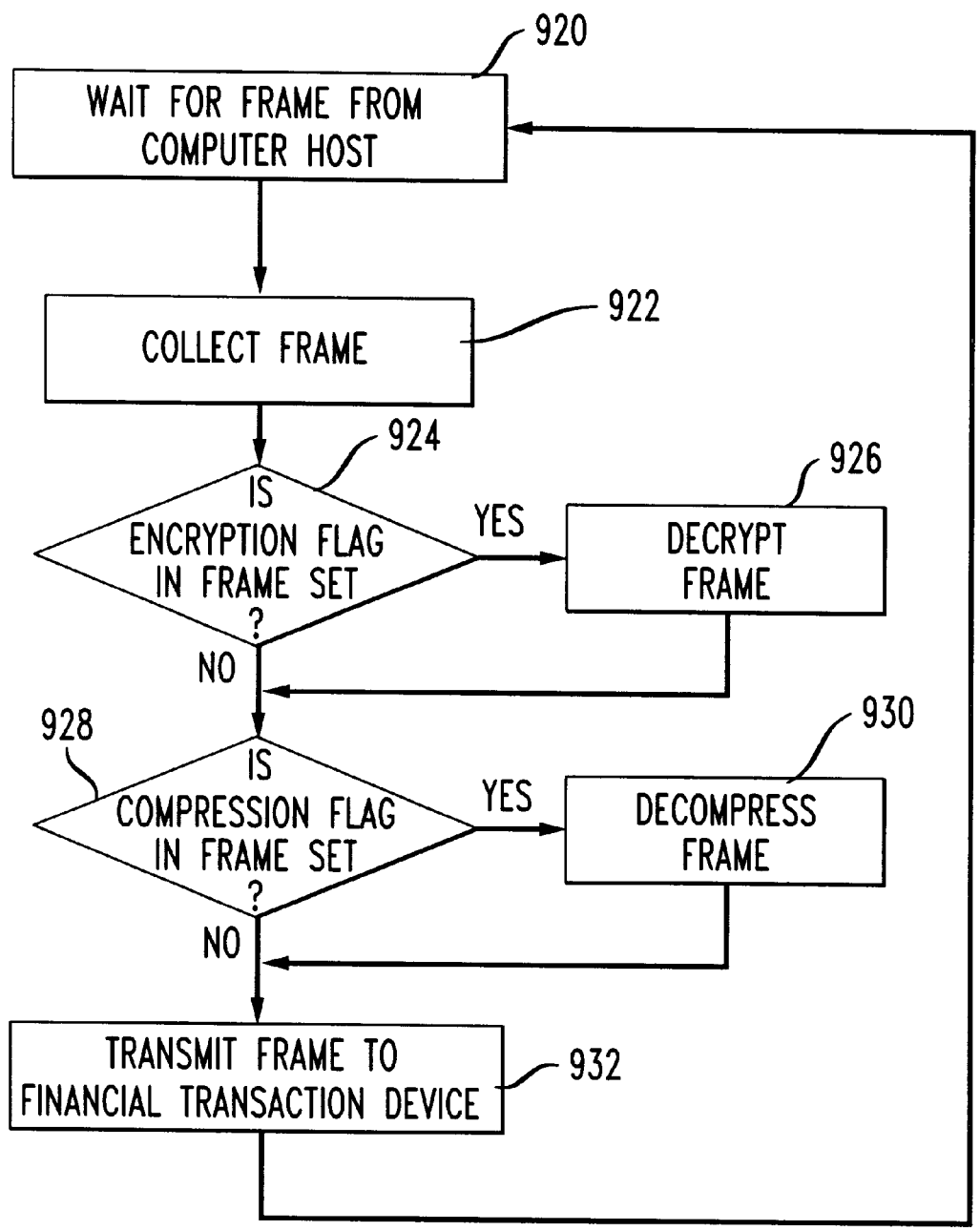
FIG. 13 shows a flow chart of the steps taken according to the present invention in the decompression and/or decryption of the data frame received from the host computer.

As shown in FIG. 13, the data frames transmitted by the host computer 500 to the wireless adaptor 200 may also be compressed and/or encrypted, requiring decryption and de-compression of the data frame. In step 920 the wireless adaptor 200 waits for a data frame and collects a data frame from the host computer 500 in step 922. The wireless adaptor 200 checks a flag contained in a header of the data frame in decision 924 which indicates if the data frame is encrypted or not. If the data frame is encrypted, the wireless adaptor decrypts the data frame in step 926 using an algorithm selected to recover the pre-encryption data from the encrypted data frame.

The wireless adaptor 200 also checks a flag contained in the header of the data frame in decision 928 which indicates if the data frame is compressed or not. If the data frame is compressed, the wireless adaptor recovers the original data from the data frame in step 930 using an algorithm selected to recover the pre-compressed data from the compressed data frame.

The wireless adaptor 200 then transmits the data frame to the terminal 100 in step 932. It should be noted that the data may be received from the host computer 500 in plaintext (no compression or encryption), received as compressed data (only compressed, with no encryption), received as encrypted data (only encrypted, with no compression) or received as encrypted compressed data (both compression and encryption were performed on the data). The steps of decryption and de-compression are performed in a sequence which recovers the original, uncompressed and unencrypted data frame.

In summary, the operation of the wireless transaction system illustrated in FIGS. 2 and 3 will be discussed. The terminal 100 transmits a data frame which is indicative of a request for authorization of a particular financial transaction or which is part of the execution of an electronic settlement of previously authorized transactions. The wireless adaptor 200 receives this data frame and, optionally, compresses and encrypts the data frame. The wireless adaptor 200 transits the data frame, which may be compressed and encrypted, to the host computer 500. The wireless adaptor 200 may also add error detection and correction codes to the data frame prior to its transmission.

This transmission is accomplished via a wireless transmission system, which includes at least a first wireless modem 300 and its associated antenna 310 and a second wireless modem 330 and its associated antenna 320. As shown in FIGS. 2–4, the wireless transmission system may also include one or more wireless network terminals, other wireless modems and antennas, and other communications means. The host computer 500 is connected to the wireless transmission system by a communications means 450.

The host computer 500 receives the data from the wireless adaptor 200 and decrypts and/or decompresses the data frame, as needed. The host computer 500 then communicates with an authorization processor 600, via a communications means 550, to obtain from the authorization processor an authorization or denial of a particular financial transaction, or to provide to the authorization processor data indicative of an electronic settlement process.

The data frame received by the host computer 500 from the authorization processor 600 is then transmitted to the wireless adaptor 200, via the wireless transmission system. The data frame which is transmitted to the wireless adaptor 200 may be compressed and/or encrypted prior to its transmission by the host computer 500.

The wireless adaptor 200 receives the data frame from the host computer 500 and decrypts and decompresses the data frame, as needed. The wireless adaptor 200 then transmits the data frame to the terminal 100.

It has been shown that the invention provides an adaptor which enables an existing financial transaction device to be operated in a wireless fashion. It has further been shown that the invention provides a wireless financial transaction system which uses an existing financial transaction device operated in a wireless fashion. It has still further been shown that the invention provides additional data security to the operation of an existing financial transaction device.

The present invention has been described in relation to particular embodiments of the invention which are intended to be illustrative rather than restrictive. Alternative embodiments of the invention, particularly those which include the use of a financial transaction device other than a point-of-sale credit card terminal, such as a point-of-sale debit card terminal, computerized cash register or automated teller machine, will become apparent to those skilled in the art to which the present invention pertains without departing from the scope and spirit of the invention. Accordingly, the scope of the present invention is defined by the appended claims rather than the foregoing description.

We claim:

1. A method of providing additional data security between a host computer which communicates with an authorization processor and which also communicates with a financial transaction device compatible with the public switched telephone network, said financial transaction device capable of transmitting signals indicative of a financial transaction and further capable of receiving signals indicative of the authorization or denial of a financial transaction, said method comprising the steps of:

receiving the signals from the financial transaction device indicative of a financial transaction using a phone line interface and communications processor in a first signal format compatible with the public switched telephone;

encrypting and converting the signals received by said phone line interface to a second signal format different from the first signal format and incompatible with the public switched telephone system, thereby producing encrypted data in the second signal format indicative of a financial transaction;

transmitting said encrypted data in the second signal format from said communications processor to a host computer;

decrypting said encrypted data in the second signal format at said host computer to recover digital data representative of the signals indicative of a financial transaction as transmitted by the financial transaction device;

transmitting from said host computer to an authorization processor said recovered digital data and receiving from said authorization processor said recovered digital data and receiving from said authorization processor at said host computer signals indicative of the authorization or denial of a financial transaction;

converting the host computer signals to the second signal format; and transmitting from said host computer to the financial transaction device the signals indicative of the authorization or denial of the financial transaction.

2. The method of claim 1 wherein the financial transaction device is a point-of-sale credit card terminal.

3. The method of claim 1 wherein the financial transaction device is a point-of-sale debit card terminal.

4. The method of claim 1 wherein the financial transaction device is an automated teller machine.

5. The method of claim 1 wherein the financial transaction device is a computerized cash register.

6. The method of claim 1 wherein the step of transmitting from said host computer to the financial transaction device the signals indicative of the authorization or denial of a financial transaction further comprises the following steps:

encrypting the signals indicative of the authorization or denial of a financial transaction in the second signal format to produce encrypted data indicative of the authorization or denial of a financial transaction in the second signal format;

transmitting from said host computer to said communications processor said encrypted data indicative of the authorization or denial of a financial transaction in the second signal format;

decrypting said encrypted data indicative of the authorization or denial of a financial transaction and converting said data to recover digital data representative of the signals indicative of the authorization or denial of a financial transaction in the first signal format; and transmitting to the financial transaction device from the communications processor said recovered digital data indicative of the authorization or denial of a financial transaction.

7. The method of claim 6 wherein the financial transaction device is a point-of-sale credit card terminal.

8. The method of claim 6 wherein the financial transaction device is a point-of-sale debit card terminal.

9. The method of claim 6 wherein the financial transaction device is an automated teller machine.

10. The method of claim 6 wherein the financial transaction device is a computerized cash register.

11. The method of claim 1, wherein the encrypted signal in the second signal format is transmitted by wireless modem to the host computer.

12. The method of claim 6, wherein the encrypted signal in the second signal format is transmitted by wireless modem to the financial transaction device.

* * * * *